(12) United States Patent
Koizumi et al.

(10) Patent No.: US 8,075,034 B2
(45) Date of Patent: Dec. 13, 2011

(54) MOUNTING STRUCTURE FOR VEHICLE INTERIOR PARTS

(75) Inventors: Masayuki Koizumi, Aichi (JP); Yusaku Furukawa, Aichi (JP)

(73) Assignee: Toyota Shatai Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/920,213

(22) PCT Filed: May 8, 2009

(86) PCT No.: PCT/JP2009/058674
§ 371 (c)(1),
(2), (4) Date: Aug. 30, 2010

(87) PCT Pub. No.: WO2010/035542
PCT Pub. Date: Apr. 1, 2010

(65) Prior Publication Data
US 2011/0006557 A1    Jan. 13, 2011

(30) Foreign Application Priority Data
Sep. 26, 2008   (JP) ................................ 2008-247410

(51) Int. Cl.
*B60R 7/04* (2006.01)
(52) U.S. Cl. ..................... 296/24.34; 296/70
(58) Field of Classification Search ............... 296/24.34, 296/70, 72, 74, 1.08
See application file for complete search history.

(56) References Cited

U.S. PATENT DOCUMENTS

| | | | |
|---|---|---|---|
| 4,767,153 A * | 8/1988 | Kawasaki et al. | 296/193.02 |
| 6,167,772 B1 * | 1/2001 | Wakabayashi | 74/469 |
| 6,250,678 B1 * | 6/2001 | Yoshinaka et al. | 280/752 |
| 6,843,521 B1 * | 1/2005 | Oana | 296/70 |
| 7,237,816 B1 * | 7/2007 | Singh et al. | 296/24.34 |
| 7,401,830 B2 * | 7/2008 | Akimoto et al. | 296/24.34 |
| 7,513,549 B2 * | 4/2009 | Tomasson et al. | 296/24.34 |
| 7,568,756 B2 * | 8/2009 | Meier | 296/193.02 |
| 7,753,423 B2 * | 7/2010 | Zellner, Jr. | 296/1.08 |
| 7,770,954 B2 * | 8/2010 | D'Alessandro | 296/24.34 |
| 7,802,831 B2 * | 9/2010 | Isayama et al. | 296/24.34 |
| 7,875,226 B2 * | 1/2011 | Ma et al. | 264/257 |
| 2010/0013256 A1 * | 1/2010 | Arndt et al. | 296/24.34 |
| 2010/0090491 A1 * | 4/2010 | Hipshier et al. | 296/24.34 |
| 2011/0121596 A1 * | 5/2011 | Beyer | 296/24.34 |

FOREIGN PATENT DOCUMENTS

| | | |
|---|---|---|
| JP | 3 107356 | 5/1991 |
| JP | 6 171397 | 6/1994 |
| JP | 2000 43648 | 2/2000 |
| JP | 2000 142175 | 5/2000 |
| JP | 2001 163119 | 6/2001 |
| JP | 2008 74224 | 4/2008 |

* cited by examiner

*Primary Examiner* — Jason S Morrow
(74) *Attorney, Agent, or Firm* — Oblon, Spivak, McClelland, Maier & Neustadt, L.L.P.

(57) ABSTRACT

A mounting structure for vehicle interior parts includes a console member and a shift panel having an upper panel and a lower panel. An insertion portion that is inserted into a dent formed in a rear end of the console member is provided on a rear end of the lower panel. Left and right outer side surfaces of the insertion portion of the lower panel and left and right inner side surfaces of the dent of the console member are configured to be engageable by inserting engaging projections into engaging recesses. The engaging recesses are provided so as to restrict movements of the engaging projections in their longitudinal direction, and to allow positional deviation of the engaging projections in the vertical direction.

20 Claims, 6 Drawing Sheets

MOUNTING STRUCTURE FOR VEHICLE INTERIOR PARTS

TECHNICAL FIELD

The present invention relates to a mounting structure for vehicle interior parts that includes a console member disposed on a floor of a vehicle and having a tip end engaged with an instrument panel, and a shift panel having a tip end engaged with the instrument panel and a rear end engaged with the console member.

BACKGROUND ART

Devices such as a shift device, and interior parts such as a console box are disposed in a console between a driver's seat and a passenger seat of a vehicle.

For example, Patent Document 1 discloses a structure for assembling a console box disposed such as to cover a shift device.

In development of design for a structure around a console of a vehicle of recent years, there is proposed, for example, a structure in which large interior parts having entire lengths of about 450 to 500 mm are assembled to each other.

For example, as for a console of a vehicle, there is a structure that one ends of two long interior parts are fixed to a reference part (such as an instrument panel), the other ends are assembled to each other, and both of them are vertically connected to each other to be disposed.

However, such a structure causes the following problems. That is, in the manufacture of large-size interior parts, such large-size parts is difficult to manufacture with high dimensional accuracy in length. Therefore, if, after one ends of such interior parts are fixed to a reference part, the other ends are assembled to each other, an assembled shape can not constantly be secured due to variation in lengths of both the parts, and appearance design is degraded.

It seems to be possible to solve the above problem by carrying out operation such as positioning for adjusting a position of a part, but in this case, another problem such as deterioration of assembling workability occurs.

Therefore, there has been a need for an assembling structure capable of easily assembling even large interior parts to each other, and capable of keeping a gap and the like in their assembled state within a given range to secure quality such as appearance design.

Patent Document 1: Japanese Patent Application Laid-open No. 2008-74224

DISCLOSURE OF THE INVENTION

Problem to be Solved by the Invention

The present invention has been accomplished in view of the above conventional problems, and it is an object of the invention to provide a mounting structure for vehicle interior parts, capable of enhancing assembling workability of a console member and a shift panel disposed above the console member which are large interior parts, and capable of keeping a gap and the like in their assembled state within a given range to secure quality such as appearance design.

Means for Solving the Problem

The present invention provides a mounting structure for vehicle interior parts, comprising a console member disposed on a floor of a vehicle and having a tip end engaged with an instrument panel, and a shift panel disposed above the console member such that a space is provided therebetween, and having a tip end engaged with the instrument panel and a rear end engaged with the console member, wherein the shift panel is formed by combining an upper panel constituting an upper side of the shift panel and a lower panel constituting a lower side of the shift panel, an insertion portion that is inserted into a dent formed in a rear end of the console member is provided on a rear end of the lower panel, left and right outer side surfaces of the insertion portion of the lower panel and left and right inner side surfaces of the dent of the console member are configured to be engageable by inserting engaging projections provided on ones of them into engaging recesses provided on the others, the engaging recesses are provided so as to restrict movements of the engaging projections in their longitudinal direction and to allow positional deviation of the engaging projections in the vertical direction in a state where the engaging projections are engaged with the engaging recesses, a console engaging portion that engages with a console engaged portion provided in the instrument panel is provided on a tip end of the console member, and the console engaging portion and the console engaged portion are engaged with each other so as to allow positional deviation of the console member in the longitudinal direction with respect to the instrument panel, a lower panel engaging portion that engages with a lower panel engaged portion provided in the instrument panel is provided on a tip end of the lower panel, and the lower panel engaging portion and the lower panel engaged portion are engaged with each other so as to restrict movements of the lower panel in the vertical and longitudinal directions with respect to the instrument panel, and a tip end upper surface of the console member and a tip end lower surface of the lower panel are abutted against each other or are disposed with a gap formed therebetween without engaging with each other.

According to the mounting structure for vehicle interior parts of the present invention, the console member and the shift panel (especially the lower panel) disposed above the console member can be assembled to each other in the following procedure, for example. With this, it is possible to solve the conventional problems such as deterioration in the assembling workability and degradation of the appearance design, and to enhance the assembling workability, as well as to secure the appearance design.

More specifically, the lower panel engaging portion provided on a tip end of the lower panel and the lower panel engaged portion provided in the instrument panel are engaged with each other. According to this, the tip end of the lower panel is engaged with the instrument panel in a state where movements thereof in the vertical and longitudinal directions are restricted with respect to the position of the instrument panel.

Next, the insertion portion provided on the rear end of the lower panel is inserted into the dent formed in the rear end of the console member. Both the members are engaged with each other by inserting the engaging projection provided on one of them into the engaging recess formed on the other. According to this, the rear end of the console member is engaged with the rear end of the lower panel in a state where movement thereof in the longitudinal direction is restricted with respect to the position of the lower panel. When positional deviation in the vertical direction is generated between the lower panel and the console member, the vertical positional deviation is absorbed by the engaging recess and the engaging projection.

Simultaneously, the console engaging portion provided on the tip end of the console member and the console engaged portion provided in the instrument panel are engaged with each other. This enables the tip end of the console member to be engaged with the instrument panel. When positional deviation in the longitudinal direction is generated between the console member and the instrument panel, the longitudinal positional deviation is absorbed by the console engaging portion and the console engaged portion.

The tip end upper surface of the console member and the tip end lower surface of the lower panel are abutted against each other or are disposed with a gap formed therebetween without engaging with each other. That is, the tip end of the console member and the tip end of the lower panel are separately assembled to the instrument panel without engaging with each other.

According to the mounting structure for vehicle interior parts, as described above, when the console member and the shift panel (especially the lower panel) disposed above the console member, which are large interior parts, are to be assembled to each other, the rear end of the console member can be engaged with the rear end of the lower panel using the position of the lower panel engaged with the instrument panel as a reference without carrying out operation such as positioning for adjusting positions of both the members.

This makes it possible to easily assemble the console member and the shift panel to each other, and also to enhance the workability when both the members are assembled to each other. In addition, a gap or the like in the assembled state of both the members can fall within a given range, and the variation can be reduced, which enables quality such as appearance design to be secured.

BEST MODE FOR CARRYING OUT THE INVENTION

In the present invention, the console member is disposed on a floor of a vehicle, whereby a position thereof in the vertical direction is determined. Therefore, a positional deviation between the lower panel and the console member in the vertical direction means a positional deviation of the lower panel in the vertical direction with respect to the position of the console member.

A pair of the engaging projections may be provided on left and right inner side surfaces of the dent of the console member, and a pair of the engaging recesses may be provided in left and right outer side surfaces of the insertion portion of the lower panel.

In this case, it is relatively easy to form each of parts, and the left and right outer side surfaces of the insertion portion and the left and right inner side surfaces of the dent that are opposite to the outer side surfaces can easily be engaged with each other.

It is preferable that an inner side surface of each of the engaging recesses is configured to be surrounded by a vertically formed front end inner side surface and rear end inner side surface, and a longitudinally formed upper end inner side surface and lower end inner side surface, wherein a cross section of the engaging recess, perpendicular to the direction of depth, has a tetragonal shape, and in a state where the engaging projection is engaged, movement of the engaging projection in the longitudinal direction can be restricted by supporting the engaging projection by the front end inner side surface and the rear end inner side surface and positional deviation of the engaging projection in the vertical direction can be allowed by such a design that a distance between the upper end inner side surface and the lower end inner side surface is greater than a vertical width of the engaging projection.

In this case, the engaging recess can sufficiently restrict movement of the engaging projection in its longitudinal direction, and can sufficiently allow positional deviation in the vertical direction in a state where the engaging projections are engaged with the engaging recesses.

It is preferable that guide grooves for guiding the engaging projections into the engaging recesses are provided in left and right outer side surfaces of the insertion portion of the lower panel so as to communicate with the outer side surfaces from the side of the rear end inner side surfaces of the engaging recesses, wherein a width of each of the guide grooves is gradually increased rearward from the rear end inner side surface of the engaging recess.

In this case, it is possible to smoothly guide and insert the engaging projection into the engaging recess via the guide groove only by relatively moving the rear end of the console member close to the rear end of the lower panel.

It is preferable that a movement-preventing projection is provided on an insertion port at which the guide groove and the engaging recess intersect with each other. The movement-preventing projection prevents the engaging projection engaged with the engaging recess from moving from the insertion port toward the guide groove.

In this case, the movement-preventing projection prevents the engaging projection inserted into the engaging recess from being easily pulled out from the engaging recess.

It is preferable that the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

In this case, the tip end upper surface of the console member enters below the lower panel and is not exposed. This allows enhancement of the appearance design between the tip end of the console member and the tip end of the lower panel.

Embodiment

A mounting structure for vehicle interior parts according to an embodiment of the present invention will be described with reference to the drawings.

Figure 1:
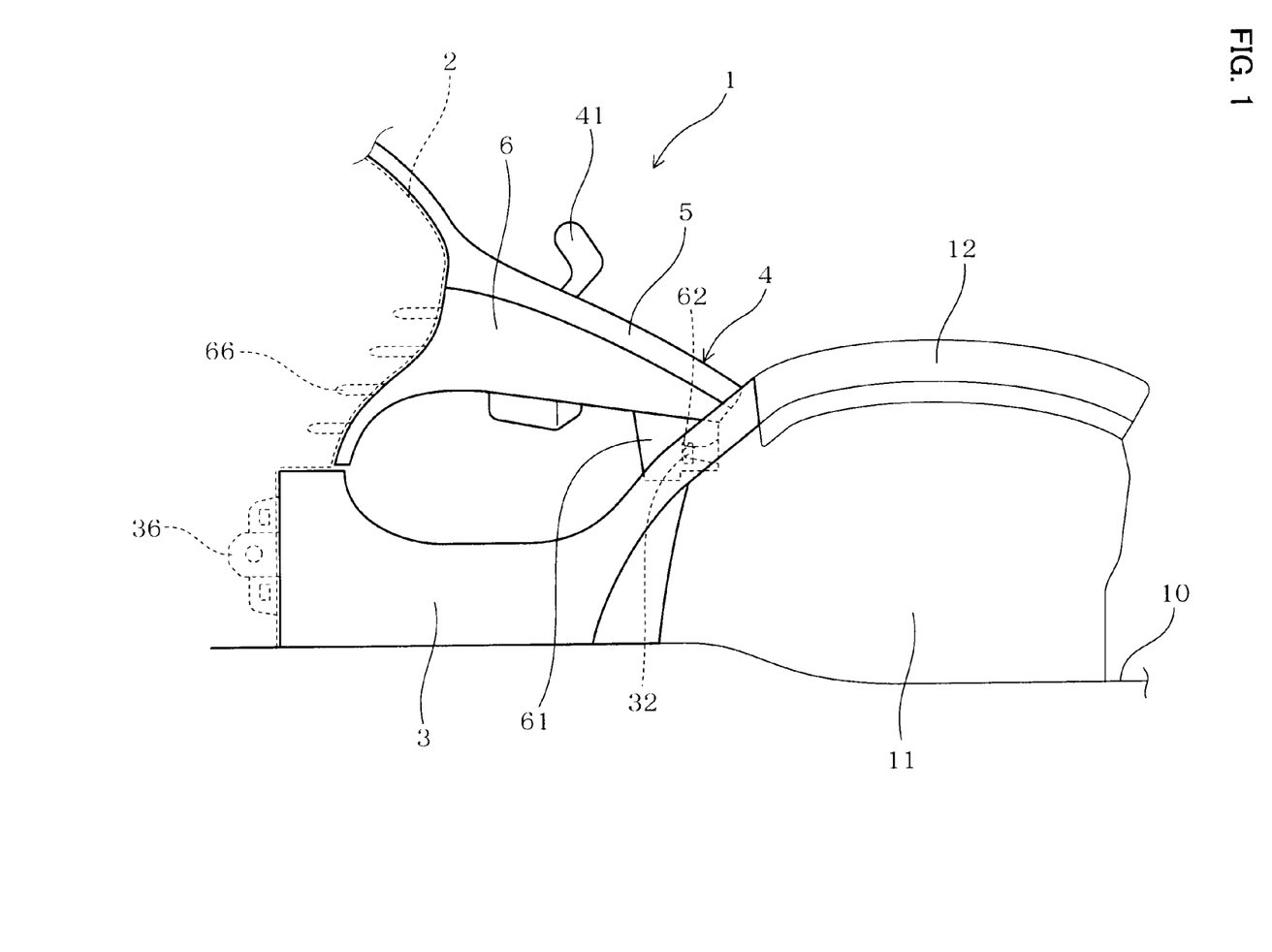
FIG. 1 is an explanatory view showing a mounting structure for vehicle interior parts according to an embodiment.

As shown in FIG. 1, the mounting structure 1 for vehicle interior parts of the present embodiment comprises a console member 3 disposed on a floor 10 of the vehicle and having a tip end thereof engaged with a lower portion of an instrument panel 2; and a shift panel 4 disposed above the console member 3 such that a space is provided therebetween and having a tip end thereof engaged with the instrument panel 2 and a rear end thereof engaged with the console member 3.

A rear console member 11 is arranged at the rear side of the console member 3. An arm rest member 12 is arranged on an upper portion of the rear console member 11.

As shown in FIG. 1, the shift panel 4 is formed by combining an upper panel 5 constituting an upper side of the shift panel 4 and a lower panel 6 constituting a lower side of the shift panel 4. A shift device (not shown) is accommodated in the shift panel 4. A shift lever 41 connected to the shift device is provided to project upwardly from inside of the shift panel 4 such as to penetrate the upper panel 5.

Figure 2:
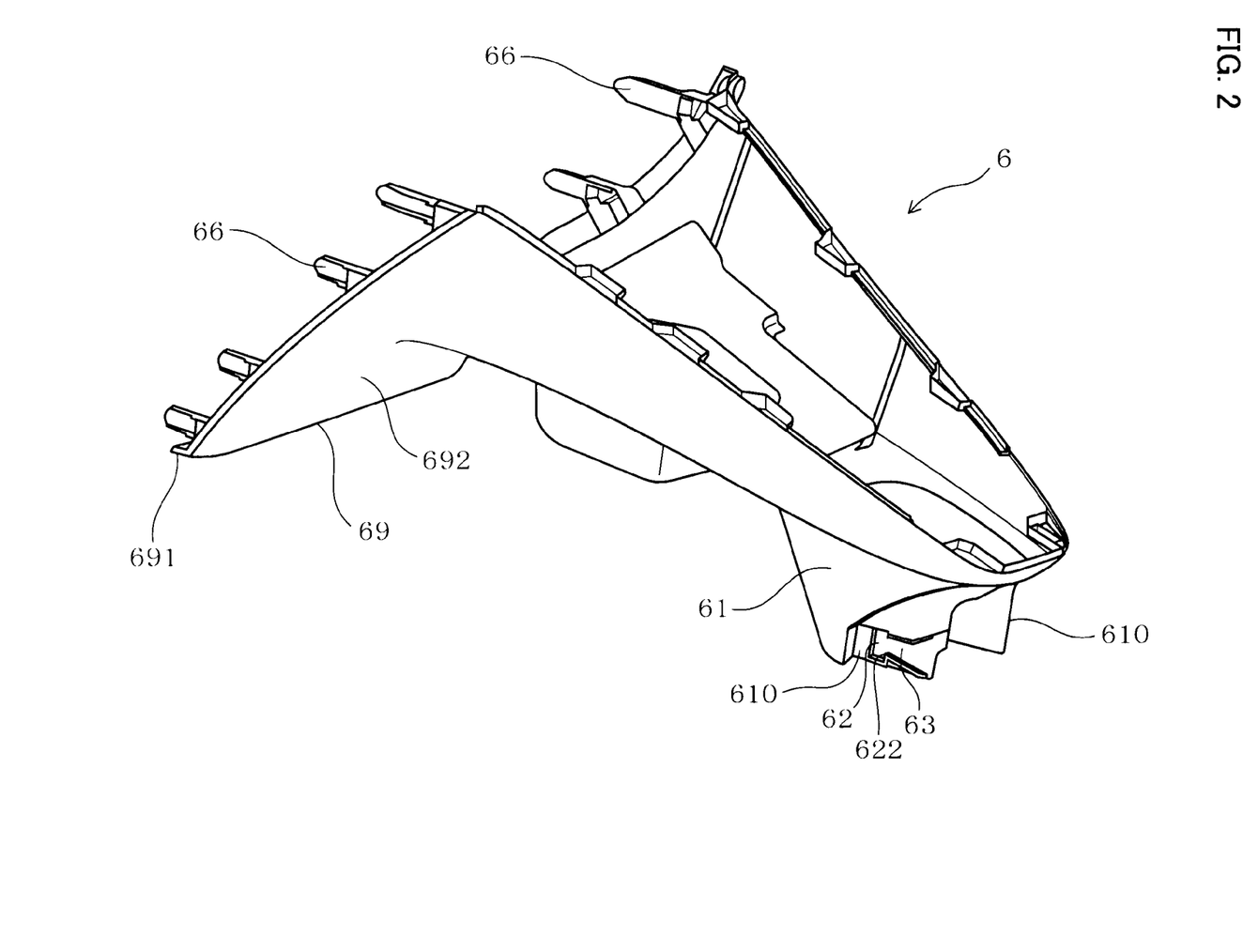
FIG. 2 is an explanatory view showing a structure of a lower panel according to the embodiment.

As shown in FIG. 2, an insertion portion 61 projecting downward is provided on a rear end of the lower panel 6 to be inserted into a later-described dent 31 formed in a rear end of the console member 3. A pair of engaging recesses 62 is formed in left and right outer side surfaces 610 of the insertion portion 61 to be dented inward.

Figure 3:
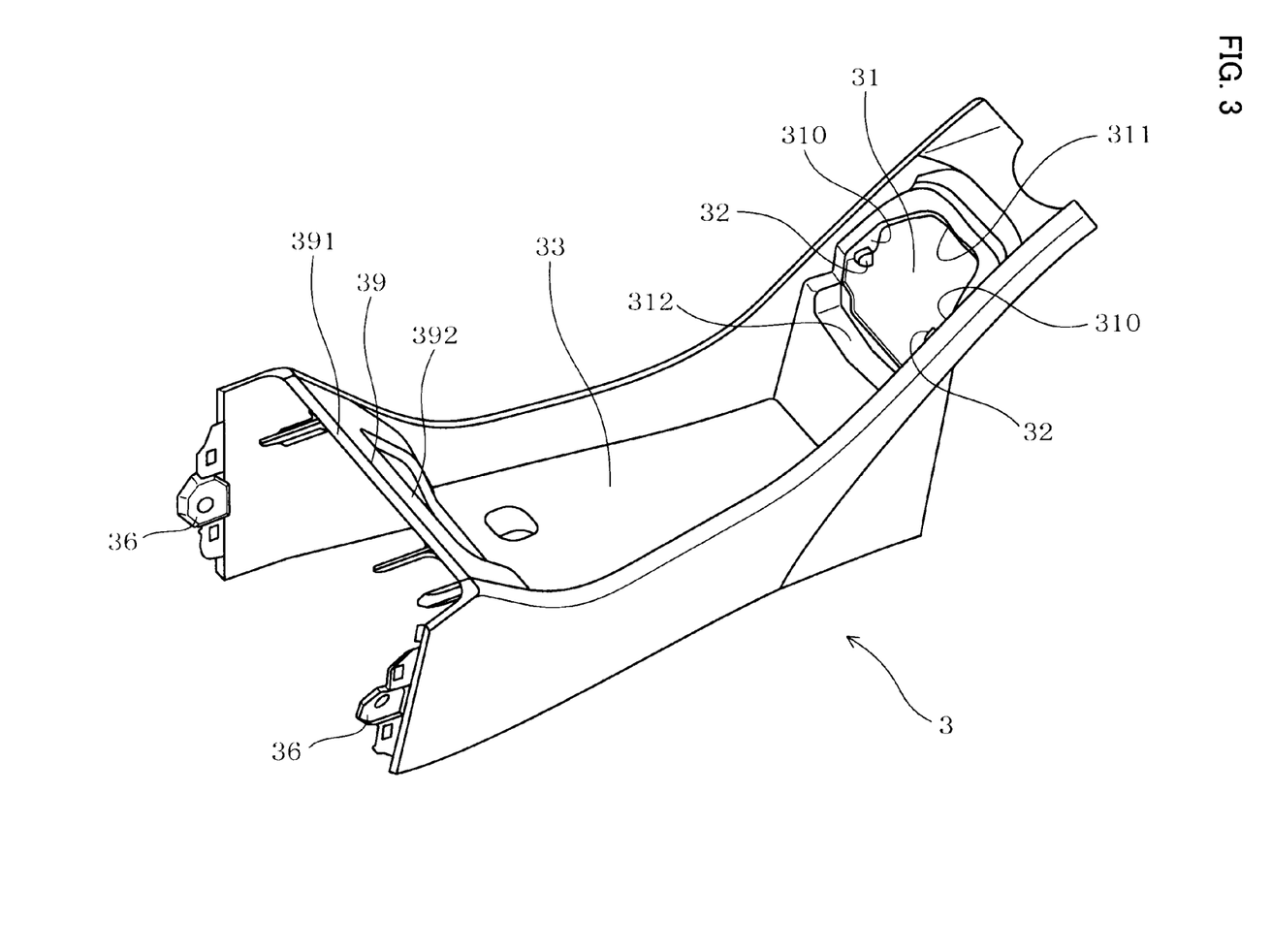
FIG. 3 is an explanatory view showing a structure of a console member according to the embodiment.

As shown in FIG. 3, the dent 31 is formed in a rear end of the console member 3 to which the above-described insertion portion 61 provided on the rear end of the lower panel 6 is inserted. The dent 31 includes a through hole 311 through which a part of the insertion portion 31 is inserted, and a supporting surface 312 that supports a lower surface of the insertion portion 31. A pair of engaging projections 32 inwardly projects from left and right inner side surfaces 310 of the dent 31. The console member 3 includes an accommodating portion 33 in which small articles and the like are accommodated.

Figure 4:
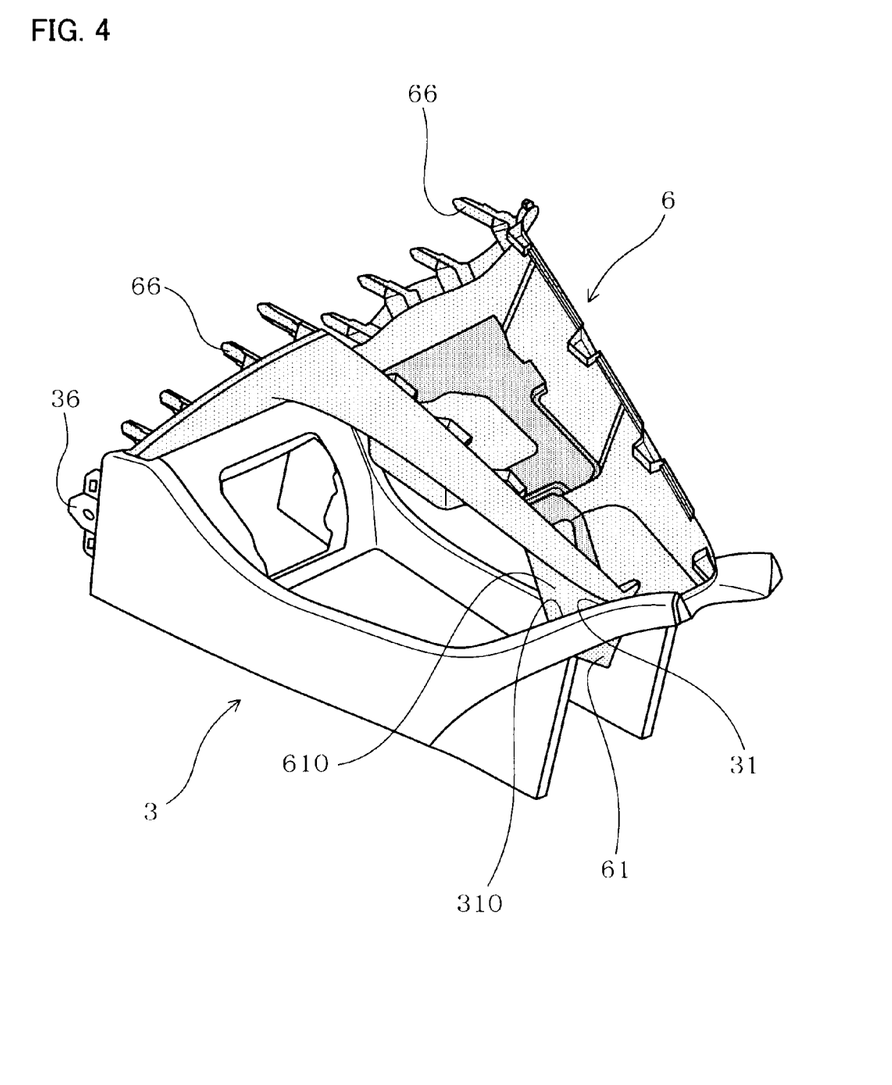
FIG. 4 is an explanatory view showing a state where the console member and the lower panel are assembled.
Figure 5:
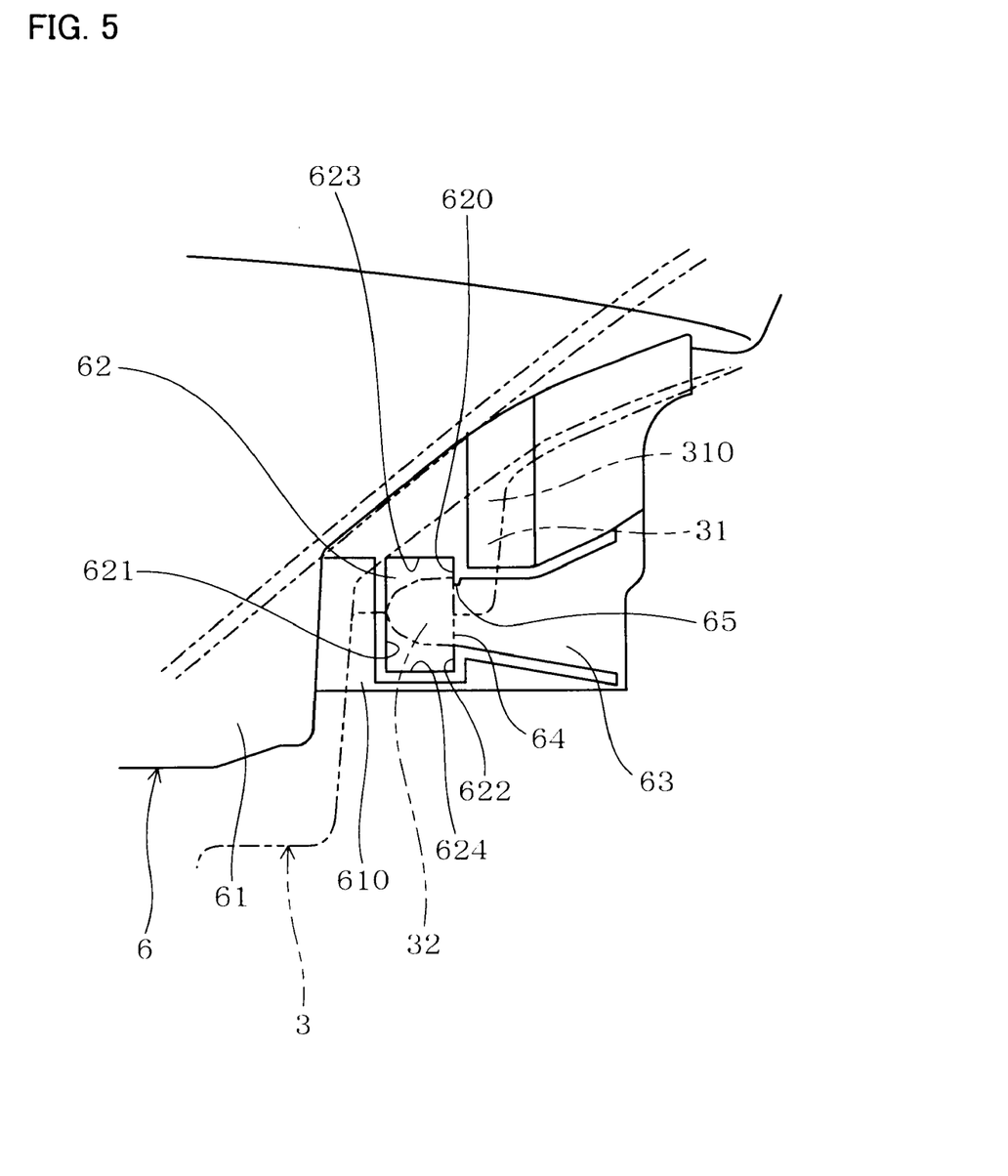
FIG. 5 is an explanatory view showing a state where an engaging projection and an engaging recess are engaged according to the embodiment.

As shown in FIGS. 4 and 5, the left and right outer side surfaces 610 of the insertion portion 61 of the lower panel 6 and the left and right inner side surfaces 310 of the dent 31 of the console member 3 that are opposite to the outer side surfaces 610 are configured to be engageable by inserting the engaging projections 32 provided in the dent 31 into the engaging recesses 62 formed in the insertion portion 61. That is, the engaging recesses 62 and the engaging projections 32 are configured to be engageable by inserting the engaging projections 32 into the engaging recesses 62.

As shown in FIG. 5, an inner side surface 620 of the engaging recess 62 is configured to be surrounded by a vertically formed front end inner side surface 621 and rear end inner side surface 622, and a longitudinally formed upper end inner side surface 623 and lower end inner side surface 624, wherein a cross section of the engaging recess 62 that intersects with a depth direction has a tetragonal shape. The engaging recesses 62 are provided so as to restrict movements of the engaging projections 32 in their longitudinal direction and to allow the positional deviation in the vertical direction in a state where the engaging projections 32 are engaged with the engaging recesses 62.

More specifically, as shown in FIG. 5, the engaging recesses 62 can restrict movements of the engaging projections 32 in their longitudinal direction by supporting the engaging projections 32 with the front end inner side surface 621 and the rear end inner side surface 622 in a state where the engaging recess 62 and the engaging projections 32 are engaged with each other. In the engaging recess 62, a distance between the upper end inner side surface 623 and the lower end inner side surface 624 is greater than a vertical width of the engaging projection 32. This makes it possible to allow positional deviation of the engaging projection 32 in the vertical direction.

As shown in FIGS. 2 and 5, guide grooves 63 are provided on the left and right outer side surfaces 610 of the insertion portion 61 so as to communicate with the engaging recess 62 from the rear end inner side surface 622 of the engaging recess 62. The guide grooves 63 guide the engaging projections 32 into the engaging recesses 62 when the engaging projections 32 are inserted into the engaging recesses 62. A groove width of each of the guide grooves 63 is gradually increased rearward from the rear end inner side surface 622 of the engaging recess 62.

As shown in FIG. 5, a movement-preventing projection 65 is provided on an insertion port 64 at which the guide groove 63 and the engaging recess 62 intersect with each other. The movement-preventing projection 65 prevents the engaging projections 32 engaged with the engaging recess 62 from moving from the insertion port 64 toward the guide groove 63.

As shown in FIGS. 1 and 2, a lower panel engaging portion 66 that engages with a lower panel engaged portion (not shown) provided in the instrument panel 2 is provided on a tip end of the lower panel 6. The lower panel engaging portion 66 and the lower panel engaged portion are engaged with each other so as to restrict movement of the lower panel 6 in vertical and longitudinal directions with respect to the instrument panel 2.

As shown in FIGS. 1 and 3, a console engaging portion 36 that engages with a console engaged portion (not shown) provided in a lower portion of the instrument panel 2 is provided on a tip end of the console member 3. The console engaging portion 36 and the console engaged portion are engaged with each other so as to allow positional deviation of the console member 3 in the longitudinal direction with respect to the instrument panel 2.

Figure 6:
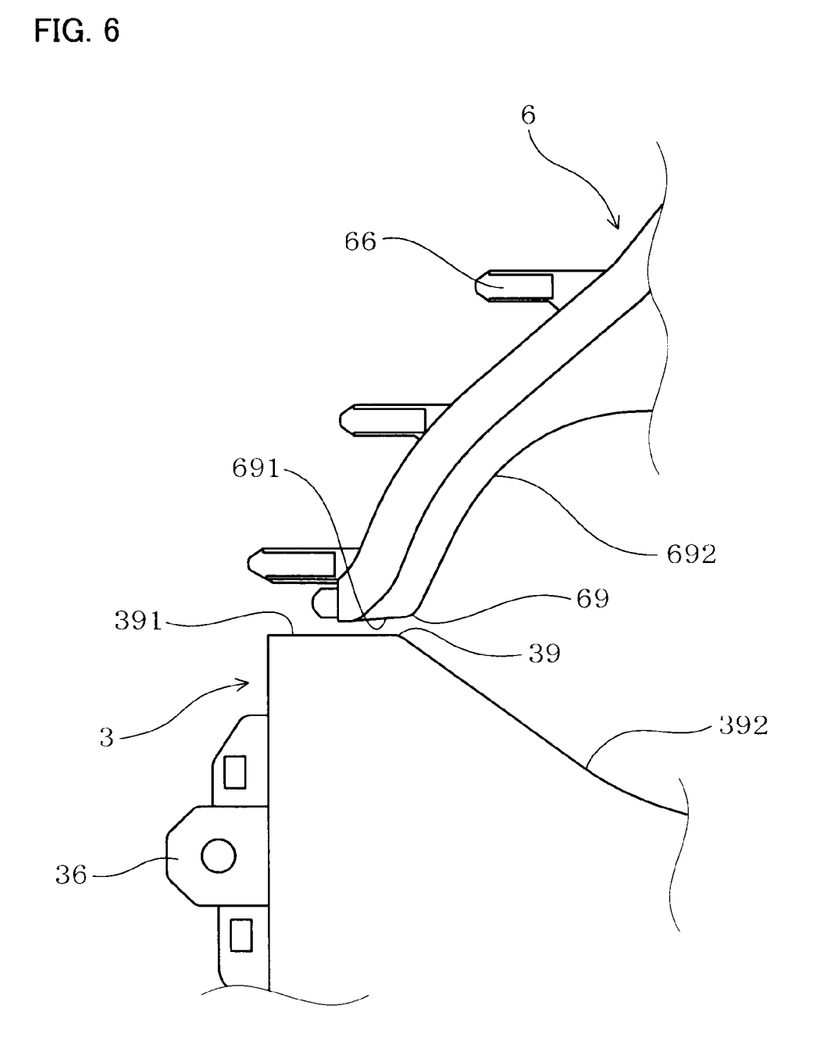
FIG. 6 is an explanatory view showing a positional relation between a tip end of the console member and a tip end of the lower panel.

As shown in FIGS. 2 and 6, the lower panel 6 includes a rising angle portion 69 formed between the tip end lower surface 691 and a rising surface 692 that rises upward from a rear end of the tip end lower surface 691.

As shown in FIGS. 3 and 6, the console member 3 includes a falling angle portion 39 formed from a tip end upper surface 391 and a falling surface 392 falling downward from a rear end of the tip end upper surface 391.

As shown in FIG. 6, the rising angle portion 69 provided on the tip end of the lower panel 6 is located in the rear of the falling angle portion 39 provided on the tip end of the console member 3 in a longitudinal positional relation.

The tip end lower surface 691 of the lower panel 6 and the tip end upper surface 391 of the console member 3 are disposed with a gap formed therebetween without engaging with each other.

Next, advantageous effect of the mounting structure 1 for vehicle interior parts of the embodiment will be described.

The mounting structure 1 for vehicle interior parts of the embodiment can assemble the console member 3 and the shift panel 4 (especially the lower panel 6) in the following procedure. According to this, it is possible to solve the conventional problems such as deterioration in the assembling workability and degradation of the appearance design, and to enhance the assembling workability, and to secure the quality of appearance design.

More specifically, as shown in FIG. 1, the lower panel engaging portion 66 provided on the tip end of the lower panel 6 and the lower panel engaged portion (not shown) provided in the instrument panel 2 are engaged with each other. According to this, the tip end of the lower panel 6 is engaged with the instrument panel 2 with respect to the position of the instrument panel 2 in a state where movements in vertical and longitudinal directions are restricted.

Next, as shown in FIG. 4, the insertion portion 61 provided on the rear end of the lower panel 6 is inserted into the dent 31 provided in the rear end of the console member 3. In reality, a part of the insertion portion 61 is inserted into the through hole 311 (FIG. 3) to support a lower surface of the insertion portion 61 with the supporting surface 312 (FIG. 3).

As shown in FIG. 5, the engaging projection 32 is inserted into the engaging recess 62, thereby engaging both members with each other. More specifically, the rear end of the console member 3 is moved to be close to the rear end of the lower panel 6, and the engaging projection 32 is inserted into the engaging recess 62 by passing the engaging projection 32 through the insertion port 64 from the guide groove 63. With this, the rear end of the lower panel 6 and the rear end of the console member 3 are engaged with each other with respect to the position of the lower panel 6 in a state where the movement in the longitudinal direction is restricted.

The engaging projections 32 inserted into the engaging recess 62 can not easily move from the insertion port 64 toward the guide groove 63 by the movement-preventing projection 65.

The console member 3 is arranged on the floor 10 of the vehicle, whereby its position in the vertical direction is determined. When positional deviation of the lower panel 6 and the console member 3 from each other is generated in the vertical direction, the positional deviation in the vertical direction is absorbed by the engaging recess 62 and the engaging projection 32.

The console engaging portion 36 provided on the tip end of the console member 3 and the console engaged portion (not shown) provided in the lower portion of the instrument panel 2 are engaged with each other at the same time when the rear end of the console member 3 is engaged with the rear end of the lower panel 6. According to this, the tip end of the console member 3 is engaged with the lower portion of the instrument panel 2. When positional deviation of the console member 3 and the lower portion of the instrument panel 2 is generated in the longitudinal direction, this positional deviation in the longitudinal direction is absorbed by the console engaging portion 36 and the console engaged portion.

As shown in FIG. 6, on the other hand, the tip end upper surface 391 of the console member 3 and the tip end lower surface 691 of the lower panel 6 are disposed with a gap formed therebetween without engaging with each other. That is, the tip end of the console member 3 and the tip end of the lower panel 6 are separately assembled to the instrument panel 2 without engaging with each other.

After the lower panel 6 and the console member 3 are assembled to each other, the upper panel 5 of the shift panel 4 is assembled to the lower panel 6.

As described above, according to the mounting structure 1 of the embodiment, when the console member 3 and the shift panel 4 (especially the lower panel 6) disposed above the console member 3, which are large interior parts, are assembled to each other, the rear end of the console member 3 can be engaged with the rear end of the lower panel 6 with respect to the position of the lower panel 6 engaged with the instrument panel 2 without carrying out operation such as positioning for adjusting positions of both members.

Therefore, it is possible to easily assemble the console member 3 and the shift panel 4 to each other, and to enhance the assembling workability of these members. A gap or the like formed in the assembled state of both members can fall within a given range, and the deviation can be reduced, which enables quality such as appearance design to be secured.

In this embodiment, as shown in FIGS. 2 and 5, the guide grooves 63 for guiding the engaging projections 32 into the engaging recesses 62 are provided on the left and right outer side surfaces 610 of the insertion portion 61 of the lower panel 6 so as to communicate with the engaging recess 62 from the rear end inner side surface 622 of the engaging recess 62. The groove width of each of the guide grooves 63 is gradually increased rearward from the rear end inner side surface 622 of the engaging recess 62. According to this, it is possible to smoothly guide and insert the engaging projections 32 into the engaging recesses 62 via the guiding grooves 63 only by moving the rear end of the console member 3 close to the rear end of the lower panel 6.

As shown in FIG. 5, the movement-preventing projection 65 is provided on the insertion port 64 at which the guide groove 63 and the engaging recess 62 intersect with each other. The movement-preventing projection 65 prevents the engaging projections 32 engaged with the engaging recess 32 from moving from the insertion port 64 toward the guide groove 63. With this configuration, the movement-preventing projection 65 prevents the engaging projection 32 inserted into the engaging recess 62 from being easily pulled out from the engaging recess 62.

As shown in FIG. 6, the console member 3 includes a falling angle portion 39 formed from a tip end upper surface 391 and a falling surface 392 falling downward from the rear end of the tip end upper surface 391. The lower panel 6 includes the rising angle portion 69 formed between the tip end lower surface 691 and the rising surface 692 rising upward from the rear end of the tip end lower surface 691. The falling angle portion 39 is located in front of the rising angle portion 69 in a longitudinal positional relation. According to this, the tip end upper surface 391 of the console member 3 enters below the lower panel 6 and is not exposed. Therefore, the appearance design between the tip end of the console member 3 and the tip end of the lower panel 6 can be enhanced.

The invention claimed is:

1. A mounting structure for vehicle interior parts, comprising:
    a console member disposed on a floor of a vehicle and having a tip end engaged with an instrument panel, and a shift panel disposed above the console member such that a space is provided therebetween, and having a tip end engaged with the instrument panel and a rear end engaged with the console member, wherein
    the shift panel is formed by combining an upper panel constituting an upper side of the shift panel and a lower panel constituting a lower side of the shift panel,
    an insertion portion that is inserted into a dent formed in a rear end of the console member is provided on a rear end of the lower panel,
    left and right outer side surfaces of the insertion portion of the lower panel and left and right inner side surfaces of the dent of the console member, which confront the left and right outer side surfaces of the insertion portion are configured to be engageable by inserting engaging projections provided on ones of them into engaging recesses formed in the others,
    the engaging recesses are provided so as to restrict movements of the engaging projections in their longitudinal direction and to allow positional deviation in the vertical direction in a state where the engaging projections are engaged with the engaging recesses,
    a console engaging portion that engages with a console engaged portion provided in the instrument panel is provided on a tip end of the console member, and the console engaging portion and the console engaged portion are engaged with each other so as to allow positional deviation of the console member in the longitudinal direction with respect to the instrument panel,
a lower panel engaging portion that engages with a lower panel engaged portion provided in the instrument panel is provided on a tip end of the lower panel, and the lower panel engaging portion and the lower panel engaged portion are engaged with each other so as to restrict movements of the lower panel in the vertical and longitudinal directions with respect to the instrument panel, and
a tip end upper surface of the console member and a tip end lower surface of the lower panel are abutted against each other.

2. The mounting structure for vehicle interior parts according to claim 1, wherein a pair of the engaging projections is provided on the left and right inner side surfaces of the dent of the console member, and
a pair of the engaging recesses is provided in the left and right outer side surfaces of the insertion portion of the lower panel.

3. The mounting structure for vehicle interior parts according to claim 2, wherein an inner side surface of each of the engaging recesses is configured to be surrounded by a vertically formed front end inner side surface and rear end inner side surface, and a longitudinally formed upper end inner side surface and lower end inner side surface, a cross section of the engaging recess that intersects with a depth direction has a tetragonal shape, and
in a state where the engaging projection is engaged, movement of the engaging projection in the longitudinal direction is restricted by supporting the engaging projection with the front end inner side surface and the rear end inner side surface, and positional deviation of the engaging projection in the vertical direction is allowed by such a design that a distance between the upper end inner side surface and the lower end inner side surface is greater than a vertical width of the engaging projection.

4. The mounting structure for vehicle interior parts according to claim 3, wherein guide grooves for guiding the engaging projections into the engaging recesses are provided in the left and right outer side surfaces of the insertion portion of the lower panel so as to communicate with the engaging recess from the side of the rear end inner side surfaces of the engaging recesses, and
the guide grooves are each provided such that a width thereof is gradually increased rearward from the rear end inner side surface of the engaging recess.

5. The mounting structure for vehicle interior parts according to claim 4, wherein a movement-preventing projection is provided on an insertion port at which the guide groove and the engaging recess intersect with each other for preventing the engaging projection engaged with the engaging recess from moving from the insertion port toward the guide groove.

6. The mounting structure for vehicle interior parts according to claim 1, wherein the console member includes a falling angle portion formed from a tip end upper surface and a falling surface falling downward from a rear end of the tip end upper surface,
the lower panel includes a rising angle portion formed between the tip end lower surface and a rising surface rising upward from a rear end of the tip end lower surface, and
the falling angle portion is located in front of the rising angle portion in a longitudinal positional relation.

7. The mounting structure for vehicle interior parts according to claim 2, wherein the console member includes a falling angle portion formed from a tip end upper surface and a falling surface falling downward from a rear end of the tip end upper surface,
the lower panel includes a rising angle portion formed between the tip end lower surface and a rising surface rising upward from a rear end of the tip end lower surface, and
the falling angle portion is located in front of the rising angle portion in a longitudinal positional relation.

8. The mounting structure for vehicle interior parts according to claim 3, wherein the console member includes a falling angle portion formed from a tip end upper surface and a falling surface falling downward from a rear end of the tip end upper surface,
the lower panel includes a rising angle portion formed between the tip end lower surface and a rising surface rising upward from a rear end of the tip end lower surface, and
the falling angle portion is located in front of the rising angle portion in a longitudinal positional relation.

9. The mounting structure for vehicle interior parts according to claim 4, wherein the console member includes a falling angle portion formed from a tip end upper surface and a falling surface falling downward from a rear end of the tip end upper surface,
the lower panel includes a rising angle portion formed between the tip end lower surface and a rising surface rising upward from a rear end of the tip end lower surface, and
the falling angle portion is located in front of the rising angle portion in a longitudinal positional relation.

10. The mounting structure for vehicle interior parts according to claim 5, wherein the console member includes a falling angle portion formed from a tip end upper surface and a falling surface falling downward from a rear end of the tip end upper surface,
the lower panel includes a rising angle portion formed between the tip end lower surface and a rising surface rising upward from a rear end of the tip end lower surface, and
the falling angle portion is located in front of the rising angle portion in a longitudinal positional relation.

11. A mounting structure for vehicle interior parts, comprising:
a console member disposed on a floor of a vehicle and having a tip end engaged with an instrument panel, and a shift panel disposed above the console member such that a space is provided therebetween, and having a tip end engaged with the instrument panel and a rear end engaged with the console member, wherein
the shift panel is formed by combining an upper panel constituting an upper side of the shift panel and a lower panel constituting a lower side of the shift panel,
an insertion portion that is inserted into a dent formed in a rear end of the console member is provided on a rear end of the lower panel,
left and right outer side surfaces of the insertion portion of the lower panel and left and right inner side surfaces of the dent of the console member, which confront the left and right outer side surfaces of the insertion portion are configured to be engageable by inserting engaging projections provided on ones of them into engaging recesses formed in the others,
the engaging recesses are provided so as to restrict movements of the engaging projections in their longitudinal direction and to allow positional deviation in the vertical direction in a state where the engaging projections are engaged with the engaging recesses, a console engaging portion that engages with a console engaged portion provided in the instrument panel is provided on a tip end of the console member, and the console engaging portion and the console engaged portion are engaged with each other so as to allow positional deviation of the console member in the longitudinal direction with respect to the instrument panel, a lower panel engaging portion that engages with a lower panel engaged portion provided in the instrument panel is provided on a tip end of the lower panel, and the lower panel engaging portion and the lower panel engaged portion are engaged with each other so as to restrict movements of the lower panel in the vertical and longitudinal directions with respect to the instrument panel, and a tip end upper surface of the console member and a tip end lower surface of the lower panel are disposed with a gap formed therebetween without engaging with each other.

12. The mounting structure for vehicle interior parts according to claim 11, wherein a pair of the engaging projections is provided on the left and right inner side surfaces of the dent of the console member, and a pair of the engaging recesses is provided in the left and right outer side surfaces of the insertion portion of the lower panel.

13. The mounting structure for vehicle interior parts according to claim 12, wherein an inner side surface of each of the engaging recesses is configured to be surrounded by a vertically formed front end inner side surface and rear end inner side surface, and a longitudinally formed upper end inner side surface and lower end inner side surface, a cross section of the engaging recess that intersects with a depth direction has a tetragonal shape, and in a state where the engaging projection is engaged, movement of the engaging projection in the longitudinal direction is restricted by supporting the engaging projection with the front end inner side surface and the rear end inner side surface, and positional deviation of the engaging projection in the vertical direction is allowed by such a design that a distance between the upper end inner side surface and the lower end inner side surface is greater than a vertical width of the engaging projection.

14. The mounting structure for vehicle interior parts according to claim 13, wherein guide grooves for guiding the engaging projections into the engaging recesses are provided in the left and right outer side surfaces of the insertion portion of the lower panel so as to communicate with the engaging recess from the side of the rear end inner side surfaces of the engaging recesses, and the guide grooves are each provided such that a width thereof is gradually increased rearward from the rear end inner side surface of the engaging recess.

15. The mounting structure for vehicle interior parts according to claim 14, wherein a movement-preventing projection is provided on an insertion port at which the guide groove and the engaging recess intersect with each other for preventing the engaging projection engaged with the engaging recess from moving from the insertion port toward the guide groove.

16. The mounting structure for vehicle interior parts according to claim 11, wherein the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

17. The mounting structure for vehicle interior parts according to claim 12, wherein the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

18. The mounting structure for vehicle interior parts according to claim 13, wherein the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

19. The mounting structure for vehicle interior parts according to claim 14, wherein the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

20. The mounting structure for vehicle interior parts according to claim 15, wherein the console member includes a falling angle portion formed from a tip end upper surface and a falling surface falling downward from a rear end of the tip end upper surface, the lower panel includes a rising angle portion formed between the tip end lower surface and a rising surface rising upward from a rear end of the tip end lower surface, and the falling angle portion is located in front of the rising angle portion in a longitudinal positional relation.

* * * * *